Dec. 26, 1967     W. L. McKEOWN     3,360,655
ANGULAR MOTION SENSOR
Filed March 23, 1964
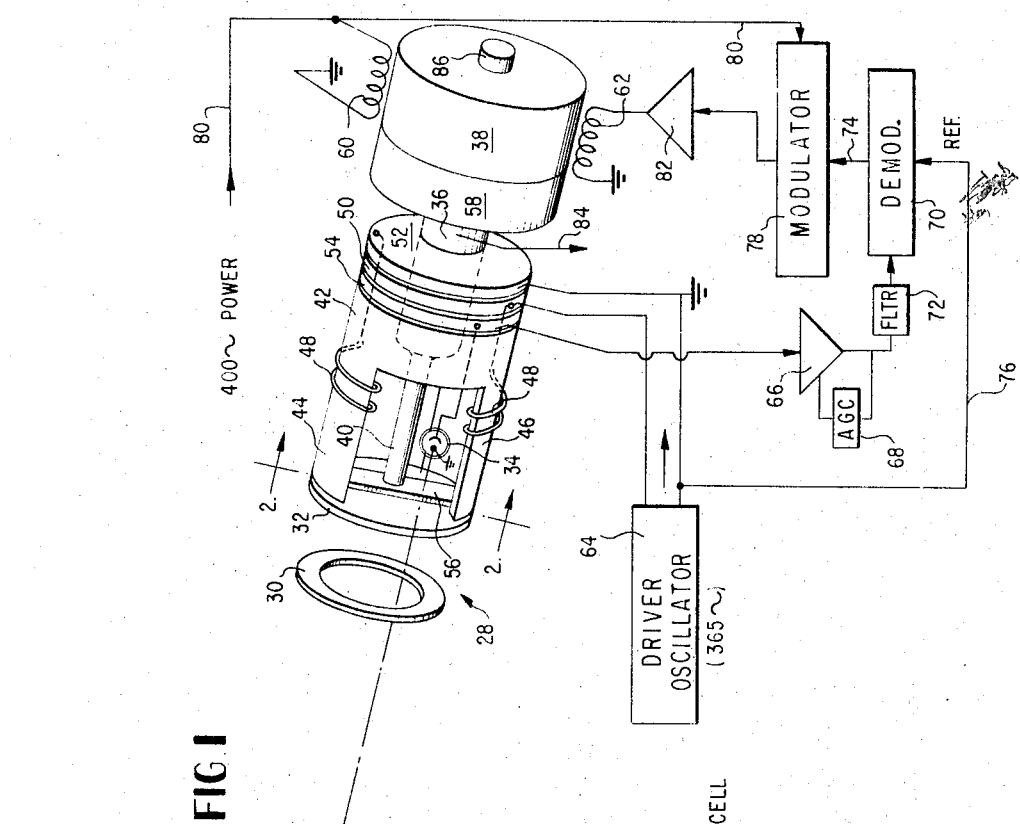
FIG. 1
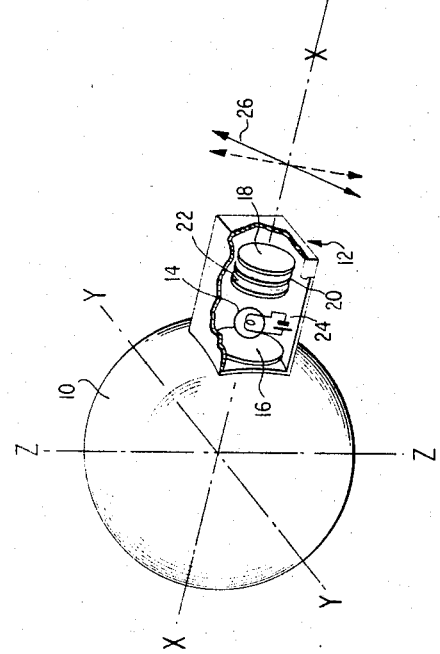
FIG. 2
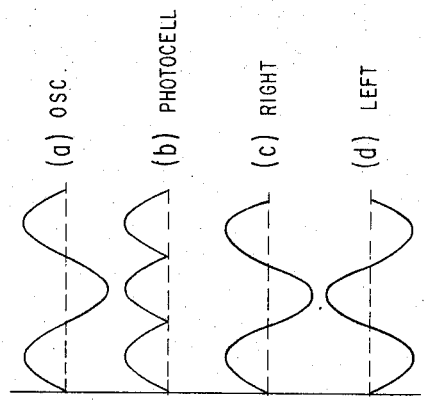
FIG. 3
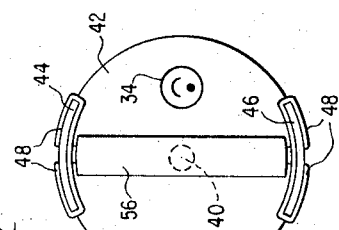
INVENTOR
WILLIAM L. McKEOWN
BY *Bean, Brooks, Buckley & Bean*
ATTORNEYS

United States Patent Office 3,360,655
Patented Dec. 26, 1967

3,360,655
ANGULAR MOTION SENSOR
William L. McKeown, Hurst, Tex., assignor to Bell
Aerospace Corporation, Wheatfield, N.Y.
Filed Mar. 23, 1964, Ser. No. 353,832
9 Claims. (Cl. 250—225)

This invention pertains to apparatus for sensing angular motion of an object about a specified axis, or its respective angular motions about a set of specified axes, without any mechanical or other physical connection between the object and the sensing apparatus. More specifically, the invention provides an apparatus of the kind using a beam of polarized light as the sole information transmission channel between the object and the sensing apparatus, and in which not only the amount of purely angular motion of the object is accurately sensed, but also the direction or "sense" of that motion.

It is known to utilize the rotation of the plane of polarization of a light beam to transmit information as to angular motions of an object about a specified axis; among the recognized advantages of such systems is the fact that they sense only components of rotation about the specified axis, and do not produce spurious outputs due to rotations about orthogonal axes nor due to lateral or translational motions of the object in the useful field of coverage. Such known systems usually depend for their operation upon the fact that the transmission of linearly polarized light through a polarization analyzer is at a minimum when its polarization direction is perpendicular to that of the incident beam. However, such null-detection systems also require some means for detecting the direction or "sense" of any misalignment from the null condition, if the sensing system is to follow accurately the rotations of the object. These sense-detecting portions of the known systems have required complications such as the use of duplicate sensors, rotating analyzers or the like, which not only complicate the apparatus but introduce requirements as to optical and/or electric signal balancing which are difficult to meet and to maintain.

The present invention provides a polarized light angular motion sensing apparatus which yields directly an indication of both the magnitude and "sense" of a rotation of the body which is under observation, and by very simple means which does not impose additional restrictions on the sensed body, and which does not require duplicate sensing channels or sensing elements with their concomitant requirement for equalization or balancing of signals and their spurious responses to changes in environmental conditions.

Briefly, the invention provides a system of the above kind in which a beam of linearly polarized light is emitted by a very simple and compact transmitter or projector attached to the object being monitored, in combination with a remotely positioned receiving or sensing system having a polarization analyzer rotated, as by an electric motor, to produce a minimum or "null" signal output when the polarization planes or directions are in the crossed condition. To effect the determination of "sense" of any misalignment resulting from a changed angular position of the transmitter about the selected axis (and hence of the polarization direction of the beam with reference to that axis), means are provided for continuously oscillating the analyzer through a small angle on opposite sides of its true null position. The phase of the alternating component of the output signal, derived for example from a photocell behind the analyzer, indicates the direction or "sense" of any rotation of the polarization plane of the beam from the previously established null position of the analyzer. Conveniently, this "sense" is utilized to control one of the phase windings of a 2-phase motor whose other phase winding is supplied from a fixed-phase source. The shaft of this servomotor directly controls the average or true null position of the oscillating analyzer, so that rotations of the object being monitored are faithfully reflected by the amount and direction of rotation of the motor shaft. The desired angular position information can then be derived from the motor shaft position for such use as is desired; for example, for controlling any device so as to follow, repeat or indicate the sensed motions of the object about the selected axis.

Conveniently, the oscillation of the analyzer about its average null position is produced by mounting the analyzer on a torsionally flexible unit which is in turn carried by the motor shaft, and oscillating the analyzer (with reference to the instantaneous shaft position) by means of a drive magnet or coil secured to said shaft and energized from an oscillator-amplifier whose tank circuit includes the drive coil, so that the oscillation is automatically maintained at the mechanical resonant frequency, so as to reduce the power requirement of the oscillator. The output of the photocell is demodulated in a phase-sensitive demodulator referenced to the oscillator amplifier frequency, and the direct current component, carrying the "sense" information, used to phase-modulate the AC supply to one winding of the 2-phase drive motor. This system, while slightly more complex than one in which the torsional oscillation is produced directly from the AC motor supply source, allows the oscillation frequency to be chosen sufficiently different from the motor supply frequency as to ensure against beats or cross effects due to undesired coupling between the various circuits and fields of the system.

By properly selecting the characteristics of the motor and the torsional system, the system can easily be designed to hold the motor shaft itself perfectly stationary unless and until a sensible change in orientation of the object has occurred. Obviously, if information as to angular position of the object about other (orthogonal) axes is also required, duplicate sensing mechanisms and transmitters relative to those axes may be provided. Within the limits established by the transmitter beam width and the acceptance angle of the sensing system, the directional information will be independent of environmental illumination changes, translational motions of the object, and other non-significant effects.

The invention will be described below in considerable detail in connection with a preferred embodiment given by way of illustration (and not for purposes of limitation), the description referring to the appended drawings, in which:

FIG. 1 is a perspective view, partly in schematic form, of a complete system according to the invention, FIG. 2 is a sectional view taken on line 2—2 of FIG. 1, and FIG. 3 is a set of wave forms illustrating the electrical direction-sensing action of the apparatus.

*Optical and electromagnetic system*

Referring first to FIG. 1 of the drawings, numeral 10 designates the body whose rotational motion is to be sensed with reference to the axis designated by X—X. While the body is indicated as a sphere, it will be understood that a body, craft or object of any geometrical shape or form may be monitored, and that sensing its rotations about other axes (such as the orthogonal axes Y—Y and Z—Z) is merely a matter of providing additional sensing systems oriented to those other axes.

To avoid all physical constraints upon the body 10, its angular position changes are transmitted in terms of the rotation, about axis X—X, of the azimuthal direction of linearly polarized light constituting a beam projected outwardly in a generally radial direction from a source fixedly connected to the body. Thus, in FIG. 1, the body has secured to it a projector 12 comprising for example, an incandescent lamp 14, a reflector 16 and a light polarizer 18. If sensing by light of a particular wave length, or by means of infra-red radiation or the like, is desired, the projector will include a suitable infra-red transmitting filter 20 or the like, and in any event a suitable heat-absorbing glass 22 may be provided to protect the polarizer from the heat of the lamp. These parts can conveniently be mounted within a small casing, as shown, containing also the battery 24 by which the lamp is energized. No external power supply or other connections to the body 10 will thus be required. Rotations of the body 10 about axis X—X will cause equal rotations of the polarizer 18 about that axis, and produce corresponding angular shifts of the position of the preferential direction of linear polarization indicated at arrow 26.

The linearly polarized beam from projector 12 is received by the sensing apparatus generally designated by reference numeral 28; for clarity of illustration, a casing for these parts (relatively fixed, in most applications, with reference to the center of body 10) has been omitted. The beam entrance window, to minimize the reception of ambient light other than from the projector, is provided by a diaphragm or field stop 30, whence the received beam passes through an off-center region of the analyzer 32 (a linear polarizer like polarizer 18) and thence to the photocell 34. In the equilibrium condition, the polarizing direction of analyzer 32 will be perpendicular to that of the polarizer 18, and the photocell 34 will therefore receive minimum illumination. However, as noted earlier, the rotational position of analyzer 32 is constantly oscillated through a small range of "dither" angle about this equilibrium position, so that photocell 34 will actually produce an output signal which includes an alternating current component at the dither frequency.

The shaft 36 connecting analyzer 32 with the two-phase servomotor 38 is preferably made in one piece, but the portion 40 thereof closest to the analyzer is of reduced diameter, to constitute a torsionally resilient connection to allow the analyzer to be oscillated through said small angular range, having a total excursion of perhaps 10 degrees, apportioned equally to opposite sides of the position corresponding to the average or neutral position which is fixed with respect to the main body of shaft 36. To produce this oscillation, shaft 36 carries a magnetic (soft iron) yoke 42 having segmented arms 44 and 46 each carrying an energizing winding or windings as indicated at 48 (see also FIG. 2). These windings are connected together for energization over slip rings 50 and 52 by means of brushes or sliding contacts so as not to interfere with rotation of the parts. A slip ring 54 also provides an output connection for photocell 34, one terminal thereof being grounded through the apparatus frame, although an additional slip ring may be used if preferred. Obviously, if the rotation angles to be monitored are not substantially more than a full revolution, slip ring connections will not be needed, and flexible conductors can be substituted.

Analyzer disc 32 is carried at the forward end of reduced shaft section 40, and to the latter is also secured a magnetic armature 56 (for example, a soft iron bar or a bar magnet) so positioned with reference to the ends of symmetrical yoke arms 44, 46 as to be deflected away from the rest position, when coils 48 are energized, in one sense or the other depending upon the direction of current flow in those coils. This deflection does not rotate the motor shaft 36 as a whole, since yoke 42 is secured directly to the thick (non-torsional) portion thereof. A geared speed reducer 58 is preferably provided between motor 38 and shaft 36, to increase the sensitivity of the drive for small changes in the angulation of the polarization plane.

Motor 38 is of conventional reversible 2-phase servomotor construction with a reference winding 60 and a phase winding 62, and rotates in a direction depending upon the phase difference between the currents supplied to those windings. If a conventional 400-cycle-per-second servomotor is employed, it is preferred to establish the natural torsional resonant frequecy of shaft portion 40, together with the analyzer 32 and armature 56, at a slightly different value (such as 355 cycles) to avoid coupling interactions.

*Circuit and operation*

The windings 48 of the "dither" system are supplied with driving current from a conventional driver oscillator 64 of any suitable construction, and in the example given at a frequency of (say) 355 cycles per second, the wave form being shown graphically at FIG. 3–a. The signal output of photocell 34 is supplied as the input to a conventional amplifier 66 (with automatic gain control 68, if desired) and the amplified output signal is applied to the phase-sensitive demodulator 70. Since there is a definite time-phase relationship between the electrical input to windings 48 and the mechanical motion of the armature 56 and analyzer 32, the output signal from the photocell has a fixed phase relationship to that from oscillator 64, and this output signal consists of a steady (DC) component plus an oscillatory (AC) component (FIG. 3–b). The steady component is rejected by the highpass filter 72, and the AC component is applied to one input of the phase-sensitive demodulator 70. The phase-reference voltage input to 70 is taken directly from oscillator 64 as at 76.

Since the light transmitted by analyzer 32 to the photocell will increase during each half-cycle of analyzer oscillation away from the center or neutral condition, the cell signal appears as a rectified sine wave (FIG. 3–b) and contains only second (and perhaps higher) harmonics of the fundamental oscillator frequency. The output of demodulator 70 is then a DC voltage proportional to the angular error of the tracker analyzer 32 with respect to the polarizer 18, the polarity of this output depending upon the direction of mis-alignment.

The output 74 of demodulator 70 is applied as one input to the modulator 78 of conventional construction, the reference input for the modulator being the same 400-cycle power supply voltage at 80 that is applied to the reference winding 60 of servomotor 38. The 400-cycle output signal from modulator 78 is amplified at 82 to a level suitable for driving the phase winding 62 of the motor. Modulator 78 includes the usual provision to provide motor winding 62 with 400-cycle current either leading or lagging, by ninety electrical degrees, the current in winding 60, in accordance with the polarity of the output of demodulator 70. The motor will therefore rotate in the direction called for by that polarity.

FIG. 3, (b) and (c) illustrate the reversal of phase which occurs in dependence upon the direction in which analyzer 32 is offset from the position for minimum light transmission. The output is a sine wave in phase with the mechanical motion, because in (FIG. 3–c) the light transmission increases during one half-cycle of the mechanical oscillation of the armature, and decreases during the other half. When the direction of offset is reversed, as in FIG. 3–d, the phase of the output reverses since the direction of rotation which produced an increasing signal in the previous case now produces a decreasing signal.

Motor 38, through gearing 58, thus rotates shaft 36 in the direction needed to position the "neutral" or average center position of analyzer 32 such that the polarizing directions are again perpendicular to one another, for zero or null output from the photocell. In this relative orientation, the output from modulator 78 becomes zero, and the motor stops.

Any pure rotational motion of object 10 about the X—X axis results in an off-null signal from cell 34, and appropriate motion of the motor shaft to cause analyzer 32 to realign itself in the null condition. Within limits set by the beam width of the projector and the acceptance angle of the receiver optics, lateral or translational movements of the body 10 will cause no motor rotation, and neither will rotations of the body about the Y—Y and Z—Z axes. The output indication can be derived from any well known or appropriate angle repeater driven by shaft 36 (indicated schematically at 84), by the extension 86 of the motor shaft, or as an electrical output or control signal from the outputs of demodulator 70, modulator 78, or power amplifier 82.

The basic accuracy of the polarized light information transmission method is preserved by this system in three ways. First, the oscillation or "dither" angle can be kept small, making the desired angular accuracy a larger proportion of the total range of operating angles. Known systems which use complete rotation of the analyzer (360 degrees) would require measuring a much smaller angle out of the total, by proportion. Second, the mean position of the analyzer with respect to the output shaft 36 is fixed mechanically, leaving no chance for errors that could be introduced by electrical circuits requiring balancing and containing balance drift problems. Third, the operation of the armature driver at its mechanical resonance frequency provides a pure sinusoidal motion of the analyzer with very low input power. This has the advantage that unbalances in the driving arrangement of poles and armature can produce only insignificant offsets of the armature position under the influence of steady components of torque on the armature. The driving power required is only that amount needed to make up for iron losses, molecular friction and windage losses. In addition, the use of mechanical "dither" eliminates the need for a plurality of photocells or analyzers, and accompanying problems associated with the previous applications of polarized light angle tracking.

Since the transmitter portion 12 can be very light and compact, it (or a plurality of them, for different axes) can be attached to an object such as 10 with a minimum of interference with other functions. For long-distance monitoring, a more powerful projector or projectors, not necessarily self-contained as to power supply, may be employed; for example in survey or craft-monitoring applications. The use of coherent light (laser) beams of linearly polarized characteristics would further extend the useful range of transmission.

While the invention has been disclosed herein in connection with a particular preferred embodiment, it will be understood that various modifications will occur to those skilled in the art, and it is intended to cover herein all such as fall within the scope of the appended claims.

What is claimed is:

1. A system for slaving a receiver to a body for rotation about a specified axis, comprising a body rotatably mounted on said axis, a projector adapted to be secured to said body for projecting a beam of linearly polarized light generally along said axis, and a receiver disposed to receive radiation from said beam; said receiver comprising a polarization analyzer, servomotor means for rotating said analyzer generally about said axis, means for continuously oscillating said analyzer through a small angular range with reference to the angular position of the analyzer established by said servomotor means, a photocell positioned to respond to light transmitted through said analyzer, and a phase-responsive circuit connecting the output of said photocell to said servomotor to cause the latter to follow and reproduce the rotation of said body, said analyzer being mounted for torsional oscillation on, and about the axis of, a shaft connected to said servomotor.

2. Apparatus in accordance with claim 1, in which the means for oscillating said analyzer comprises an electromagnetic drive fixed on said shaft and an armature secured to said analyzer.

3. Apparatus in accordance with claim 2, and a driver oscillator connected to said electromagnetic drive.

4. A system for slaving a receiver to a body for rotation about a specified axis, comprising a body rotatably mounted on said axis, a projector adapted to be secured to said body for projecting a beam of linearly polarized light generally along said axis, and a receiver disposed to receive radiation from said beam; said receiver comprising a polarization analyzer, servomotor means for rotating said analyzer generally about said axis, means for continuously oscillating said analyzer through a small angular range with reference to the angular position of the analyzer established by said servomotor means, a photocell positioned to respond to light transmitted through said analyzer, and a phase-responsive circuit connecting the output of said photocell to said servomotor to cause the latter to follow and reproduce the rotation of said body, said analyzer being mounted upon a shaft driven by said motor, said shaft having a torsionally deflectable section between said analyzer and said motor.

5. Apparatus in accordance with claim 4, and electromagnetic means carried by said shaft for oscillating said analyzer.

6. Apparatus in accordance with claim 5, in which said electromagnetic means includes spaced magnetic legs parallel to and on opposite sides of the said torsionally deflectable section.

7. Apparatus in accordance with claim 6, including a magnetic armature secured to the extremity of said torsionally deflectable section adjacent said analyzer.

8. Apparatus in accordance with claim 9, in which said photosensitive means comprises a photocell mounted adjacent said torsionally deflectable section and inwardly of said legs.

9. Apparatus in accordance with claim 5, including windings on said electromagnetic means, and slip rings on said shaft in electrical connection with said windings.

References Cited

UNITED STATES PATENTS

| | | | |
|---|---|---|---|
| 2,167,484 | 7/1939 | Berry | 318—31 |
| 2,503,023 | 4/1950 | Berry | 250—232 |
| 2,933,972 | 4/1960 | Wenking | 88—14 |
| 3,041,921 | 7/1962 | Pickels et al. | 88—14 |
| 3,157,727 | 11/1964 | Hardy et al. | 88—14 |
| 3,230,820 | 1/1966 | Wisnieff | 88—61 |
| 3,241,444 | 3/1966 | Hinderer | 88—61 |
| 3,254,227 | 5/1966 | Hock | 250—235 |

FOREIGN PATENTS 152,310    8/1961    U.S.S.R.

OTHER REFERENCES

King et al.: "Sensitive Method for Measuring Small Rotations," Journal of Scientific Instruments, vol. 38, May 1961, pp. 207–208.

Letokhov: "Photoelectric Transducer of a Linear Image Element Rotation Angle," abstract of U.S.S.R. Patent No. 152,310, 1 page.

RALPH G. NILSON, *Primary Examiner.*

ARCHIE R. BORCHELT, *Examiner.*

M. A. LEAVITT, *Assistant Examiner.*

UNITED STATES PATENT OFFICE

CERTIFICATE OF CORRECTION

Patent No. 3,360,655                       December 26, 1967

William L. McKeown

It is hereby certified that error appears in the above numbered patent requiring correction and that the said Letters Patent should read as corrected below.

Column 4, line 54, for "in (FIG. 3-c)" read -- (in FIG. 3-c) --; column 6, line 33, for the claim reference numeral "9" read -- 7 --.

Signed and sealed this 11th day of March 1969.

(SEAL)

Attest:

Edward M. Fletcher, Jr.                       EDWARD J. BRENNER

Attesting Officer                            Commissioner of Patents